Sept. 7, 1965    K. GROSSFIELD    3,204,568
DIAPHRAGMS
Filed Nov. 5, 1962
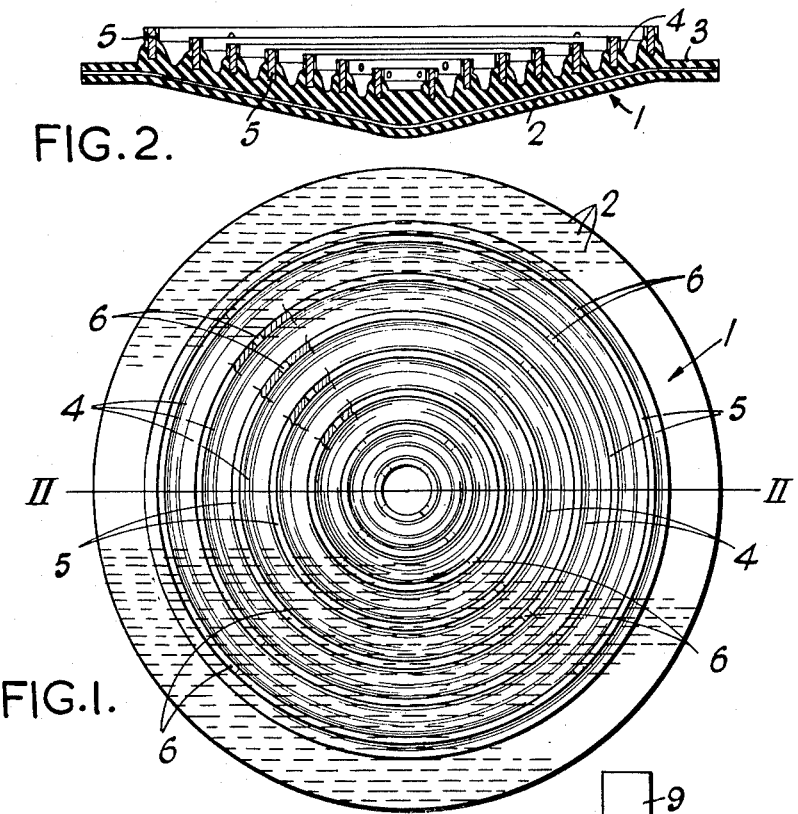
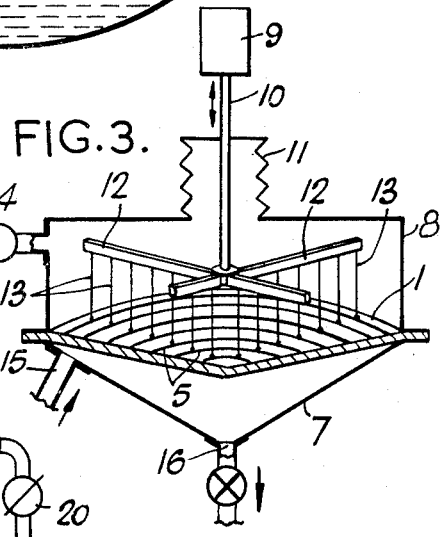
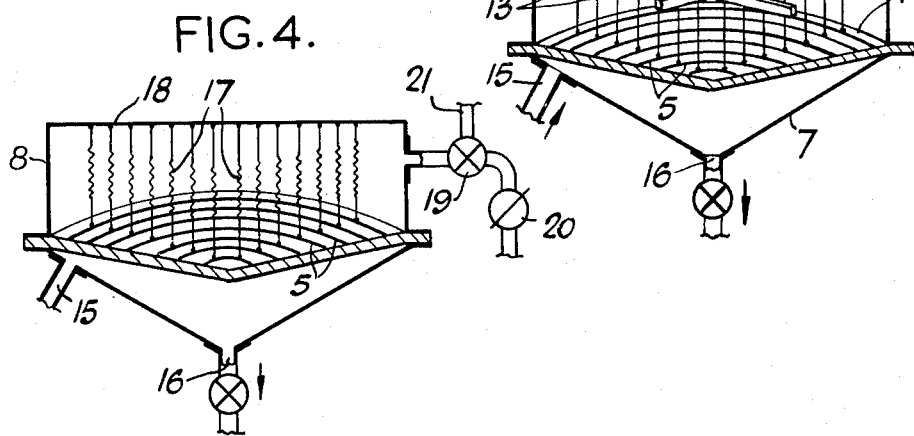

United States Patent Office 3,204,568
Patented Sept. 7, 1965

3,204,568
DIAPHRAGMS
Karl Grossfield, London, England, assignor to National Research Development Corporation, London, England, a British corporation
Filed Nov. 5, 1962, Ser. No. 235,256
Claims priority, application Great Britain, Nov. 16, 1961, 41,031/61
6 Claims. (Cl. 103—150)

This invention relates to diaphragm-operated machines, e.g. diaphragm pumps and motors, and to flexible diaphragms used in them.

The diaphragms of such pumps and motors often wear where they make contact with the mechanism that reciprocates them. It is consequently desirable to distribute the contact between diaphragm and mechanism as widely as possible over the diaphragm surface.

The scope of the present invention is defined by the appended claims, and it is believed that apparatus within it may overcome some at least of the above difficulties. Such apparatus will now be described by way of example with reference to the following drawings in which:

FIGURE 1 is a plan view of a diaphragm,
FIGURE 2 is a section on the line II—II in FIGURE 1,
FIGURE 3 is a diagrammatic section through a diaphragm pump, and
FIGURE 4 is a diagrammatic section through a modified pump.

The diaphragm of FIGURES 1 and 2, denoted by the numeral 1, comprises a strong but flexible sheet of rubber moulded in the form of a shallow cone. Parallel reinforcing cords 2 run through the sheet and render it inextensible in the direction in which they run but extensible in the direction at right angles. They could however be replaced by an insert of a cross-weave fabric that would render the sheet substantially inextensible in any direction. The upper surface 3 of the sheet is formed with concentric annular mounds 4, and rigid rings 5 are recessed in and adhere to these mounds. Holes 6 are formed through the rings 5 to receive chains 13 (FIGURE 3) or springs 17 (FIGURE 4).

The base and much of the side walls of each ring therefore adhere to a substantial area of diaphragm material. The forces created between diaphragm and rings when the latter are pulled upon by the chains 13 or springs 17 are thus distributed more widely than if the bars of each ring were simply laid against the surface of the sheet and stuck to it, or if the forces were transmitted to the diaphragm by way of a disc clamped to the center area of the diaphragm. In the latter case the forces would be concentrated upon that part of the diaphragm lying just outside the periphery of the disc; with a ring the forces are exerted upon the areas of diaphragm both inside and outside the ring.

FIGURE 3 shows a vacuum pump using the kind of diaphragm shown in FIGURES 1 and 2. The pump comprises a shallow conical pumping chamber 7 and a pressure chamber 8, the two chambers being separated by the diaphragm 1. Mechanism to reciprocate the diaphragm includes a motor 9, a shaft 10 that enters the chamber 8 through a bellows seal 11, and a cross-shaped frame 12 fixed to the end of the shaft. Chains 13 connect the frame 12 to the holes 6 in the rings 5. The pressure chamber 8 is connected to a pressure source 14 and maintained by it at positive pressure; the pumping chamber 7 has an inlet 15 leading from a vessel from which fluid is to be pumped and a valved outlet 16 leading to exhaust. Just before the start of a pumping stroke the pumping chamber 7 is full of fluid, the diaphragm is in the position shown in FIGURE 3, the inlet 15 is uncovered and the outlet 16 is shut.

During the pumping stroke the shaft 10 moves towards the pumping chamber at a speed determined by the motor 9. Due to the pressure in the pressure chamber, the diaphragm is forced into the pumping chamber, the chains 13 controlling the shape the diaphragm takes up at is moves. The length of these chains decreases from the center of the diaphragm to the circumference, and as the pumping stroke proceeds the outer area of the diaphragm makes contact with the walls of the pumping chamber first, the area of contact increasing as shaft 10 continues to move downward. The inlet 15 is covered and thus closed by the diaphragm early in the stroke. The outlet may conveniently be pressure operated, opening only when the pressure in the pump chamber exceeds the pressure the other side of the valve.

The pumping stroke is completed when the diaphragm lies flush against the walls of the pump chamber, having expelled all fluid in the pumping chamber through outlet 16.

During the reverse stroke the motor 9 now pulls the diaphragm up against the force of the positive pressure inside chamber 8. At the end of this stroke the inlet 15 is uncovered and the pumping chamber 7 fills with fluid. The cycle then starts again.

Proper "rolling" of the diaphragm down the walls of the pumping chamber during a pumping stroke depends on proper cooperation between the shapes of wall and diaphragm, the degree of pressure in the pressure chamber 8, and the dimensions of frame 12 and chains 13. As the stroke proceeds, the outer part of the diaphragm 1 comes to rest on the walls of the pumping chamber, and the chains attached to the outer rings therefore fall slack while those attached to the inner ring remain taut and hold the inner areas of the diaphragm clear of the pumping chamber walls.

In the modified pump shown in FIGURE 4, the reciprocating mechanism is done away with. A number of springs 17 connect the rings 5 to the roof 18 of the pressure chamber 8. A two-way valve 19 connects this chamber either to a pressure source 20 or to exhaust 21. On a pumping stroke, the pressure chamber 8 is connected to the source 20; the pull of the springs 17 is overcome and the diaphragm 1 is forced downwards. The strengths of the various springs 17 are chosen to ensure that the diaphragm 1 "rolls" properly down the walls of the pumping chamber. For the suction stroke, the valve 19 is changed over and the diaphragm 1 is pulled upwards by the springs 17. Again the inlet 15 is uncovered almost at the end of the suction stroke.

The reciprocating mechanism shown in FIGURE 3 could be replaced, for instance, by a mechanism in which the frame is moved by a crank lying within the pressure chamber. This crank would be rotated by a motor outside the chamber.

The invention also contemplates the use of small diaphragms having only a single ring to which the reciprocating mechanism is attached.

The rings may serve not only to distribute the loads placed upon the diaphragm during its movement by the reciprocating mechanism, but also to limit the stretching that might take place in certain directions outward from the centre if, as in the figures, the material of the diaphragm is elastic.

Although circular diaphragms have been shown in the drawings, the invention of course applies to diaphragms and rings of other shapes, e.g. elliptical diaphragms.

I claim:
1. A diaphragm-operated machine comprising wall means defining a pressure chamber; wall means defining a pumping chamber; and a flexible diaphragm separating said two chambers, said diaphragm conforming when re- laxed to the shape of said pumping chamber and comprising a sheet of flexible material, one of the surfaces of said diaphragm being formed with concentric mounds, concentric rigid rings being recessed in and adhering to said mounds, and means to reciprocate said diaphragm including means attached to said rings.

2. A diaphragm-operated machine according to claim 1 having a pressure source connected to said pressure chamber, the pressure source having means to maintain in said chamber a pressure greater than that in said pumping chamber.

3. A diaphragm-operated machine according to claim 2, in which said means to reciprocate said diaphragm comprises a frame, flexible connections between said frame and said rings, and a motor to reciprocate said frame, said flexible connections having a length such that when said diaphragm is relaxed and said connections with the innermost of said concentric rings are just slack, those connections to the rings nearer the periphery of said diaphragm are progressively more slack.

4. A diaphragm-operated machine according to claim 2, in which said means to reciprocate said diaphragm comprises springs, and a fixed support connected by said springs to said rings, the tensions of the springs being arranged such that the force exerted on unit area of the diaphragm by the springs near the center is highest, and the force per unit area by the springs nearer the periphery of said diaphragm being progressively lower, when the diaphragm lies snug against the said pumping chamber walls.

5. A flexible diaphragm for use in a diaphragm-operated machine comprising a sheet of flexible material, one of the surfaces of said diaphragm being formed with concentric mounds, rigid rings being embedded in and adhering to said mounds, and attachment devices fixed to the rings to receive corresponding devices carried by means to reciprocate the diaphragm.

6. A flexible diaphragm according to claim 5, in which said diaphragm and said rings are circular and further comprising parallel, flexible and inextensible members running through said diaphragm and are bonded to the diaphragm parallel to a selected diameter thereof, the members rendering said diaphragm extensible only in the direction normal to said diameter.

References Cited by the Examiner
UNITED STATES PATENTS
356,997  2/87  Gil _____ 103—150 X
2,734,009  2/56  Coffey.

LAURENCE V. EFNER, *Primary Examiner.*